United States Patent
Nakagawa (10) Patent No.: US 6,390,691 B1
(45) Date of Patent: May 21, 2002

(54) FOCAL-PLANE SHUTTER FOR CAMERA (75) Inventor: Tadashi Nakagawa, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/579,117

(22) Filed: May 26, 2000

(30) Foreign Application Priority Data

May 26, 1999 (JP) ............................................ 11-146640

(51) Int. Cl.⁷ ........................ G03B 19/12; G03B 9/40; G03B 17/02
(52) U.S. Cl. .................... 396/357; 396/484; 396/536
(58) Field of Search ............................... 396/484, 357, 396/443, 492, 536

(56) References Cited

U.S. PATENT DOCUMENTS 2,924,158 A * 2/1960 Kopp et al. ................. 396/513
4,163,612 A * 8/1979 Ueda et al. .................. 396/357
4,688,916 A * 8/1987 Dobashi et al. ............. 396/492
5,984,537 A * 11/1999 Park ............................ 396/443
6,088,189 A * 7/2000 Utsumi et al. ................ 360/92

* cited by examiner

Primary Examiner—Christopher E. Mahoney
(74) Attorney, Agent, or Firm—Adams & Wilks (57) ABSTRACT A focal-plane shutter for a camera has a base plate having a shutter opening and which is connectable to a body of the camera having a rear cover which can be opened and closed during a film replacement operation. The focal-plane shutter has an opening sector group having sectors for undergoing opening movement in an operational state to open the shutter opening during a shutter release operation, and a closing sector group having sectors for undergoing closing movement in an operational state to close the shutter opening during the shutter release operation. A control device controls the opening sector group and the closing sector group to open and close the shutter opening, respectively. A holding device holds the closing sector group at a nonoperational position during an opening state of the rear cover of the camera and releases the hold of the closing sector group in the nonoperational position during a closing state of the rear cover of the camera. A locking lever prevents opening of the rear cover before setting of the shutter.

8 Claims, 6 Drawing Sheets

FOCAL-PLANE SHUTTER FOR CAMERA

BACKGROUND OF THE INVENTION

1. Field of the Invention

The present invention relates generally to camera shutters and, more specifically, to a focal-plane shutter having shutter sectors for carrying out an exposure operation during use of the camera.

2. Description of the Related Art

Figure 7:
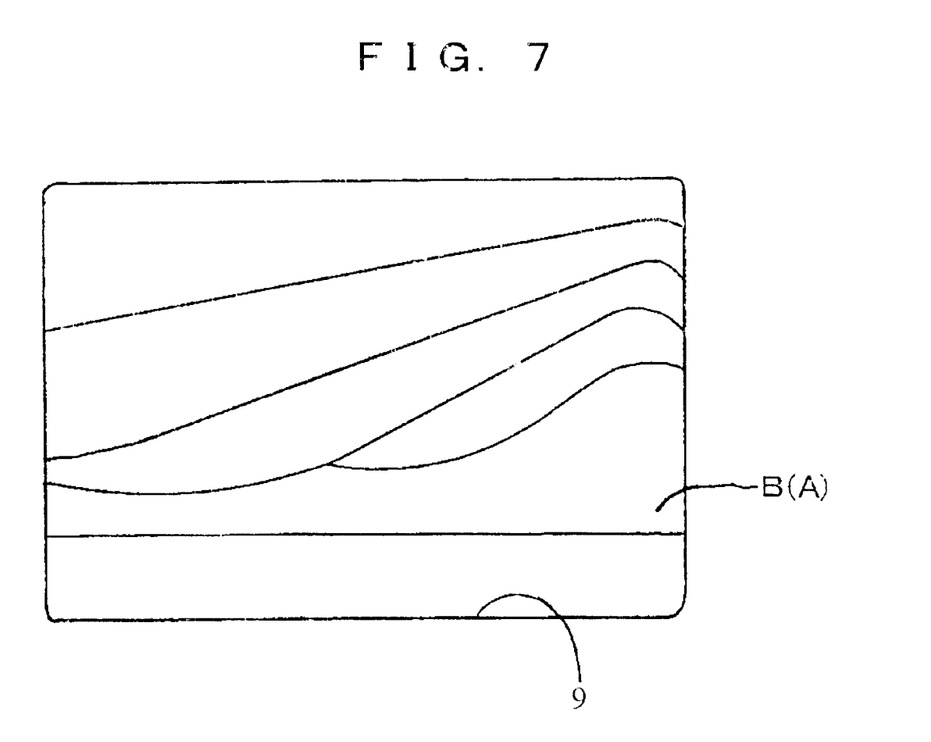
FIG. 7 is a plane view of a focal-plane shutter in a state in which a rear cover a conventional camera is opened.

Generally, a focal-plane shutter for a camera is arranged so as to cover a film surface by opening sectors before operation of the shutter and by closing sectors after operation of the shutter. In either case, when a rear cover of the camera is opened, as shown in FIG. 7, either of the opening and closing shutter sectors are exposed.

The focal-plane shutter is generally arranged immediately before the film surface. Accordingly, there are cases in which the shutter sectors are contacted directly by the hand of the camera user when the rear cover of the camera is opened to remove a photographed roll of film or to load a new roll of film. As a result of this direct contact, the shutter sectors may be subjected to deformation or breakage, or may even be inadvertently pushed into the camera, which renders the shutter sectors, and thus the focal-plane shutter, nonoperational.

SUMMARY OF THE INVENTION

In view of the foregoing disadvantage of the prior art, it is an object of the present invention to provide a focal-plane shutter for a camera in which direct contact with shutter sectors by the camera user is prevented. According to the present invention, the shutter sectors of the focal-plane shutter are evacuated from an opening portion of the camera when a rear cover of the camera is opened to prevent direct contact with the shutter sectors through the opening portion by the camera user, thereby preventing an abnormal operation of the focal-plane shutter.

The foregoing and other objects of the present invention are carried out by a focal-plane shutter which executes an exposure operation by successively operating an opening sector group and a closing sector group each having a plurality of shutter sectors. The focal-plane shutter comprises a base plate for connection to a body of a camera having a rear cover which can be opened and closed, such as during a film replacement operation. The base plate has a shutter opening. An opening sector group has a plurality of sectors for undergoing opening movement in an operational state to open the shutter opening during a shutter release operation. A closing sector group has a plurality of sectors for undergoing closing movement in an operational state to close the shutter opening during the shutter release operation. The focal-plane shutter further requires control means for controlling the opening sector group and the closing sector group to open and close the shutter opening, respectively, and holding means for holding the closing sector group at a nonoperational position during an opening state of the rear cover of the camera and for releasing the hold of the closing sector group in the nonoperational position during a closing state of the rear cover of the camera.

In another embodiment, the focal-plane shutter has a construction such that when the rear cover of the camera is opened before setting the shutter, the opening sector group is operated after setting the shutter by operating a motor built in the camera. More specifically, the opening sector group is operated by the motor when the motor is setting the shutter. After such setting of the shutter, the opening sector group is operated by a spring. When a charge member is operated by the motor, a set lever is operated by the charge member, and an opening drive lever is operated by the set lever 1. The opening sector group is then operated by the opening drive lever. Alternatively, the focal-plane shutter may have a construction such that before setting the shutter, the rear cover of the camera is brought into a nonoperational state.

According to the present invention, when rear cover of the camera is opened, a switch provided in a camera main body is closed, electricity is conducted to electromagnets and motion of the opening sector group and the closing sector group is constrained. At the same time, a holding lever is made pivotable to thereby hold the closing sectors and constrain operation thereof. Thereafter, electricity conduction to the electromagnets is cut and the opening sector group is evacuated from a shutter opening. The closing sector group is not operated since the closing sector group is held by the holding lever. Therefore, when the rear cover is opened, there is brought about a state in which both of the opening sector group and the closing sector group are evacuated from the shutter opening.

BRIEF DESCRIPTION OF THE DRAWINGS

The foregoing summary, as well as the following detailed description of a preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings.

DETAILED DESCRIPTION OF THE PREFERRED EMBODIMENTS

While this invention is susceptible of embodiments in many different forms, this specification and the accompanying drawings disclose only some examples of the use of the invention. The invention is not intended to be limited to the embodiments so described, and the scope of the invention will be pointed out in the appended claims.

Figure 1:
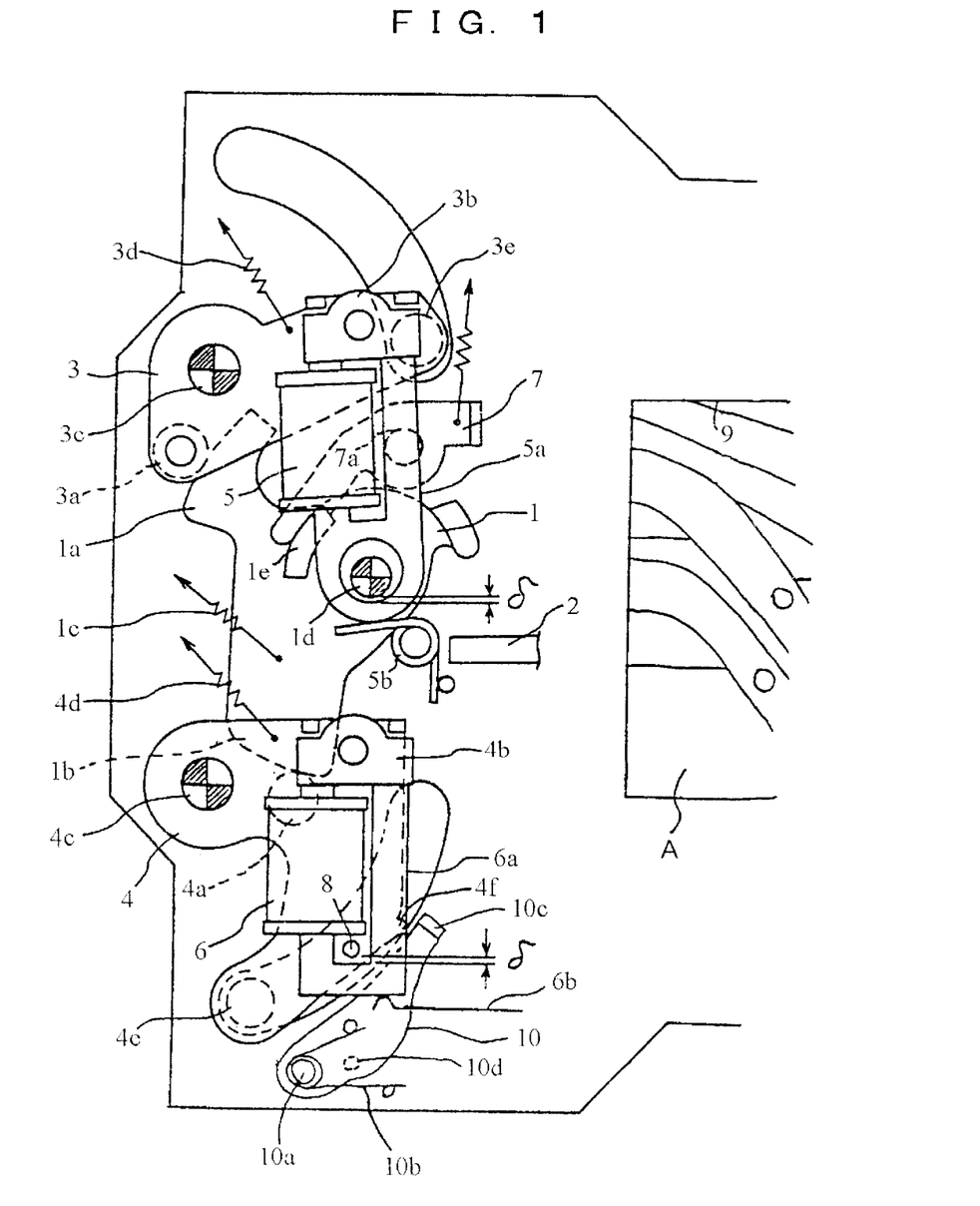
FIG. 1 is a plane view of a first embodiment of the focal-plane shutter according to the present invention in a state before the shutter is set.
Figure 2:
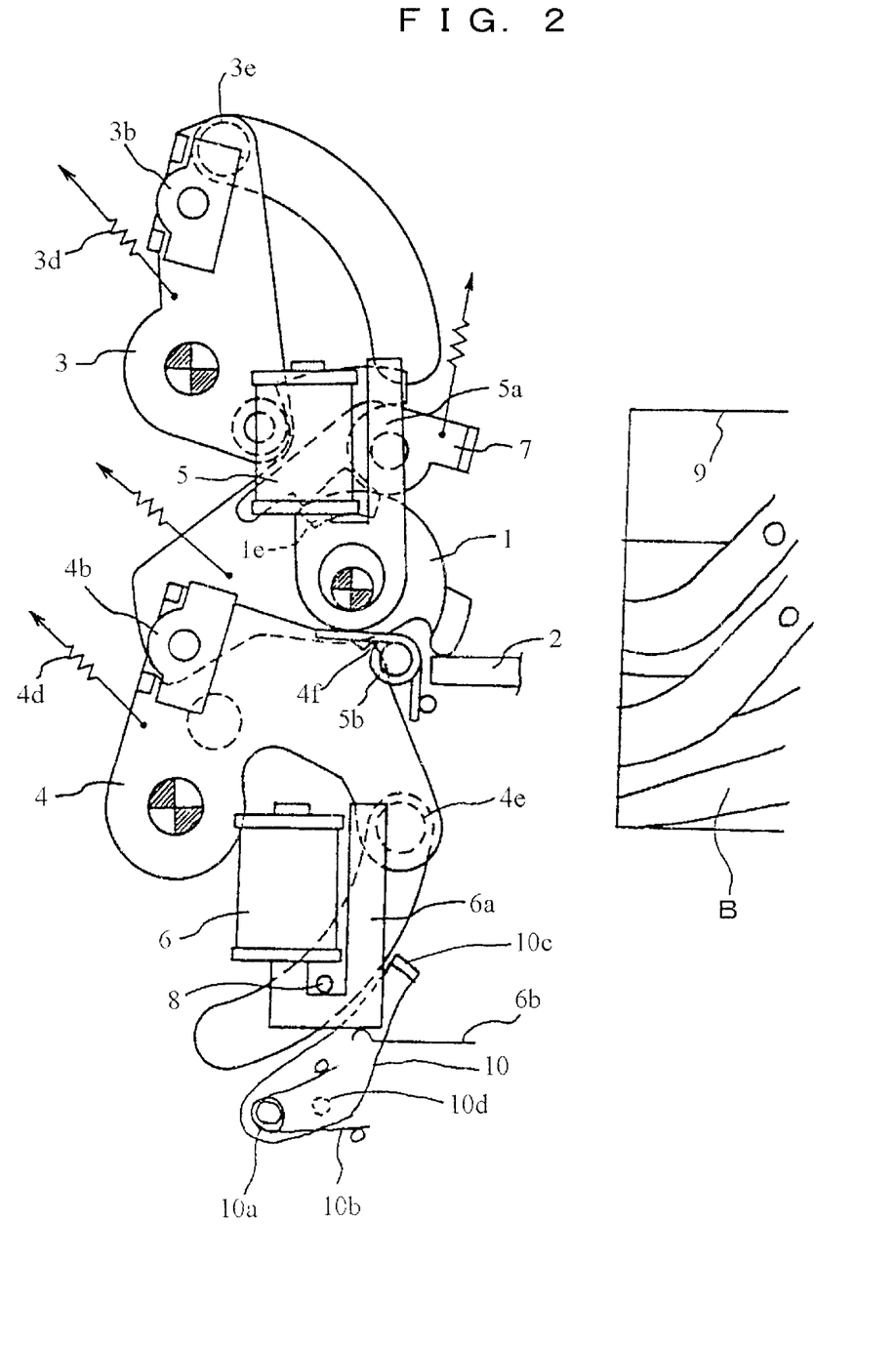
FIG. 2 is a plane view of the focal-plane shutter shown in FIG. 1 in a state after the shutter is set.

FIGS. 1 and 2 show states before and after setting of a focal-plane shutter according to an embodiment of the present invention. A set lever 1 is urged in the right pivoting direction by a spring 1c. By driving a charge member 2 in cooperation with a mechanism operated by a motor M shown in FIG. 6, the set lever 1 is pivoted in the left pivoting direction with a shaft 1d acting as a fulcrum to thereby drive an opening drive lever 3 and a closing drive lever 4 to set positions (initial states). The mechanism comprises, for example, a lever mechanism which is not shown in the drawings. When the lever mechanism is operated by the motor M, the charge member 2 is pushed up by the lever mechanism.

The set lever 1 is formed with projections 1a and 1b for pressing rollers 3a and 4a on the respective drive levers 3 and 4. The set lever 1 also has a projecting locking piece 1e constrained by a set lever claw 7, as further described below, at the set position. As described herein, "the set position" refers to the position of each member in the initial state shown in FIG. 1. In this case, at the set position, the locking piece 1e of the set lever 1 is constrained by the set lever claw 7.

Figure 4:
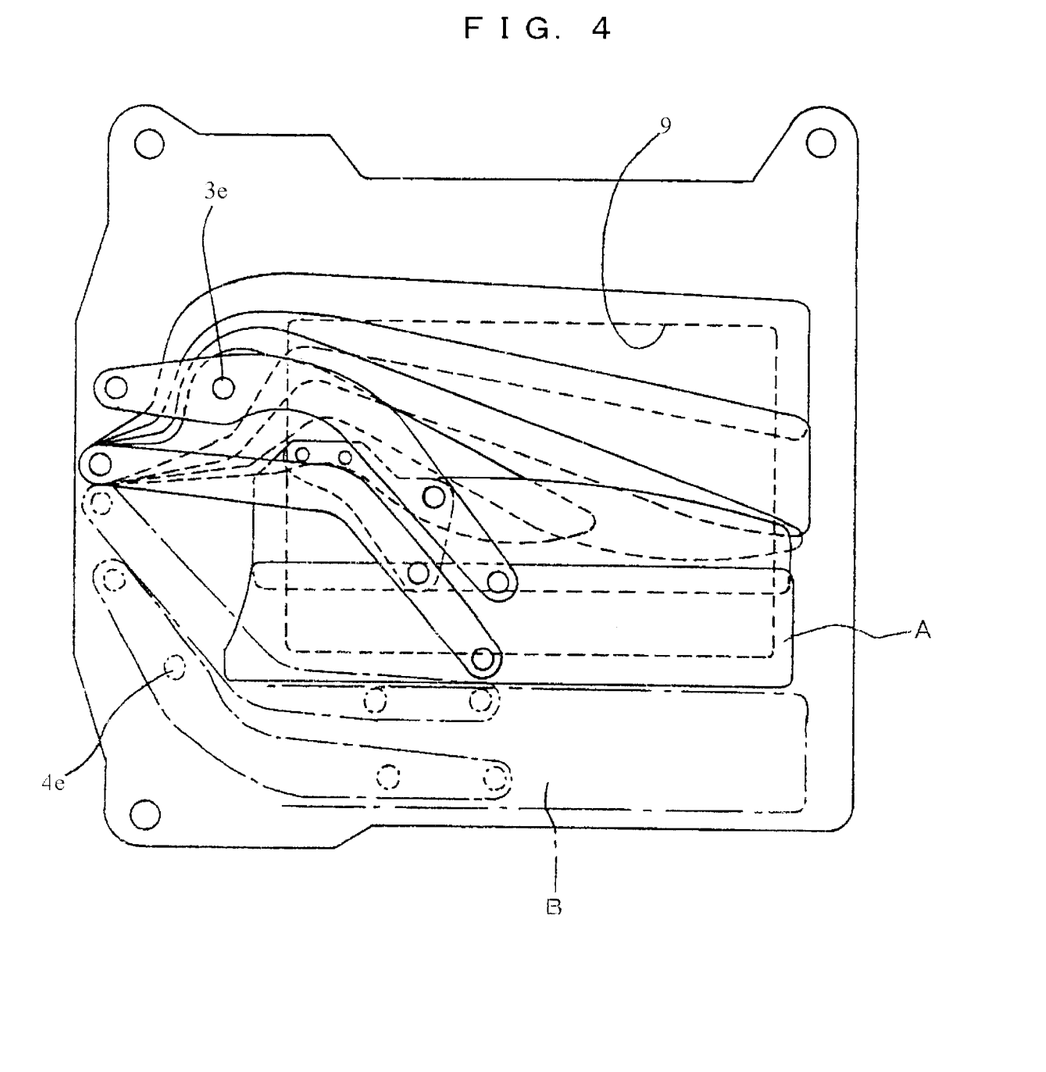
FIG. 4 is a plane view of sectors of a conventional focal-plane shutter in a set state.

The open drive lever 3 is urged in the left pivoting direction by a spring 3a about a pin 3e for evacuating an opening sector group A shown in FIG. 4 from a shutter opening 9. When the opening drive lever 3 is pivoted about a shaft 3c in the right pivoting direction to a set position by being pushed up by the set lever 1, an iron piece 3b is brought into contact with an iron core 5a while pressing down an electromagnet 5 against a spring 5b by a slightly excessive setting. Further, the closing drive lever 4 is urged in the left pivoting direction by a spring 4d about a pin 4e for covering the opening 9 with a closing sector group B shown in FIG. 4. When the closing drive lever 4 is pivoted in the right pivoting direction to the set position while centering on a shaft 4c by being pushed down by the set lever 1, an iron piece 4b is brought into contact with an iron core 6a thereof while pushing down an electromagnet 6 against a spring 6b by a slightly excessive setting. As described herein, "a slightly excessive setting" refers to the sufficient amount of pressure which is applied when the iron piece 3b is brought into contact with the iron core 5a and when the iron piece 4b is brought into contact with the iron core 6b. Stated otherwise, the pressure setting applied must be sufficient to insure that the iron pieces 3b, 4b are adsorbed by the iron cores 5a, 6b, respectively. The reason for the slightly excessive setting is that the iron pieces 3b and 4b are set in consideration of an error amount since an integration error is caused between the set lever 1 provided on the shutter side and the charge member 2 provided on the camera side.

The set lever claw 7 is provided for locking the locking piece 1e on the set lever 1 and for constraining the set lever 1 at a position at which by the slightly excessive setting, the respective electromagnets 5 and 6 respectively press the two drive levers 3 and 4 to a degree of producing the small gap β between the set lever shaft 1d also serving as a stopper in addition to a stopper 8. In this regard, when the iron core 5a is urged by the spring 5b, the iron core 5a is "stopped" by the set lever shaft 1d. When the electromagnets 5 and 6 are magnetized, the set lever claw 7 is pivoted in the right pivoting direction with a shaft 7a as a fulcrum in cooperation with the jumping of a mirror and releases constraint of the set lever 1 and returns the set lever 1. The mirror, not shown, is located in front of the shutter before the exposure. The mirror is jumped up so as to move above the shutter in order to expose.

Figure 5:
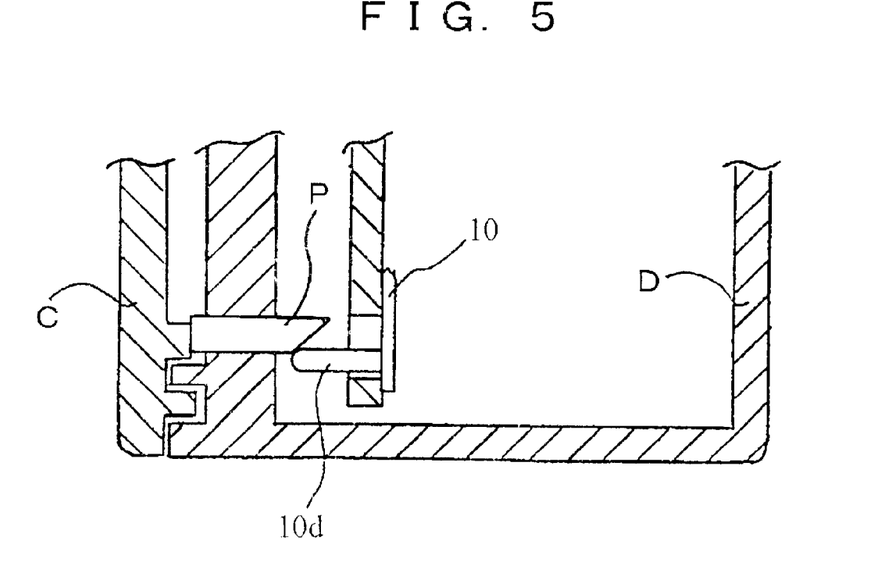
FIG. 5 is a partial sectional view of a camera using a focal-plane shutter according to a second embodiment of the present invention.

A holding lever 10 is urged in the left pivoting direction by a spring 10b with a shaft 10a acting as a fulcrum and is provided with a bent portion 10c and a pin 10d projected to a side of a rear cover C of the camera. FIG. 5 shows the state in which the rear cover C is closed. When the rear cover C is opened, the holding lever 10 is pivoted in the left pivoting direction by the spring 10b and the bent portion 10c is engaged with a hook portion 4f of the closing drive lever 4. In FIG. 4, the opening sector group A has a conventional construction, covers the shutter opening 9 and is operated by the pin 3e of the opening drive lever 3. The closing sector group B also has a conventional construction and is operated by the pin 4e of the closing drive lever 4.

Figure 6:
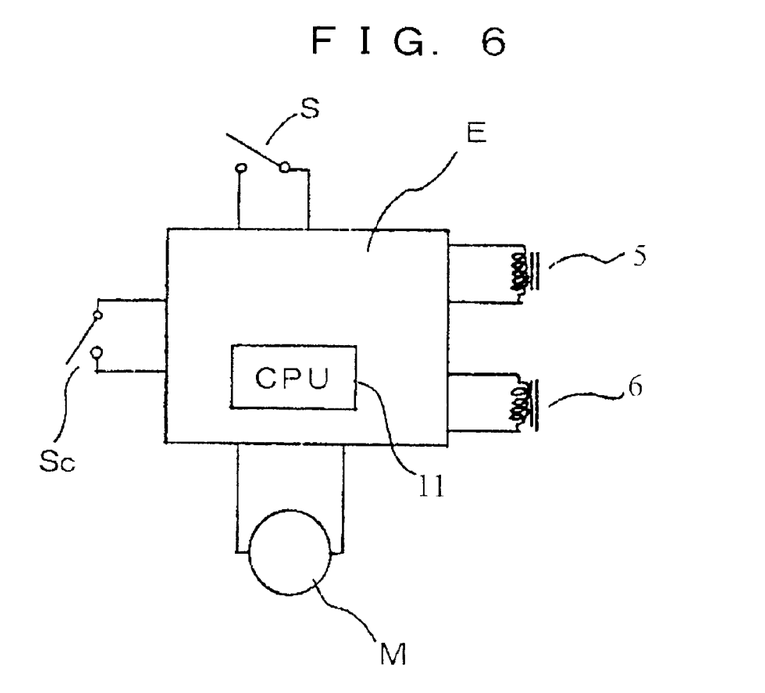
FIG. 6 is an electric circuit diagram of a camera using a focal-plane shutter according to the present invention.

As shown in FIG. 6, the camera main body is provided with a switch Sc which is closed when the rear cover C is opened and which is connected to an electric circuit E provided at the camera main body. The electric circuit E can conduct electricity to the electromagnets 5 and 6, and such conduction of electricity is controlled by a CPU 11 in the electric circuit E.

An explanation of a normal shutter operation will be given as follows.

In response to a release operation of the camera, a main switch S of the electric circuit E on the camera side shown in FIG. 6 is closed. FIG. 1 shows an initial state of the shutter. When the CPU 11 magnetizes the electromagnets 5 and 6 from the initial state, the iron pieces 3b and 4b of the respective drive levers 3 and 4 are adsorbed onto the iron cores 5a and 6a. At same time, a member, such as a movable lever not shown in the drawings, in cooperation with the jumping of the mirror, pivots the set lever claw 7 in the right pivoting direction. Therefore, the set lever 1 returns to an original position after releasing depression on the respective levers 3 and 4. Further, the opening drive lever 3 and the closing drive lever 4 execute a desired exposure operation by successively h operating the opening sector group A and the closing sector group B by demagnetizing the electromagnets 5 and 6 after intervals of desired timings.

Next, an explanation will be given of an operation in the case in which the rear cover C of the camera is opened.

Referring back to FIG. 5, when the rear cover C of the camera is opened, the rear cover C is moved from the camera main body D to the left side. As result, a pin P pushed by the rear cover C is returned to the left side by a spring, not illustrated, to thereby release the pin 10d which has been pushed down in the lower direction by a taper portion at its front end. Since the pin 10d is provided at the holding lever 10 in FIG. 1, by releasing the pin 10d the holding lever 10 is pivoted in the left direction by the spring 10b from the state shown in FIG. 1. By pivoting the spring 10 in the left pivoting direction, the bent portion 10c locks the hook portion 4f of the closing drive lever 4. As a result, the holding lever 10 holds the closing sector group in a nonoperational state.

Figure 3:
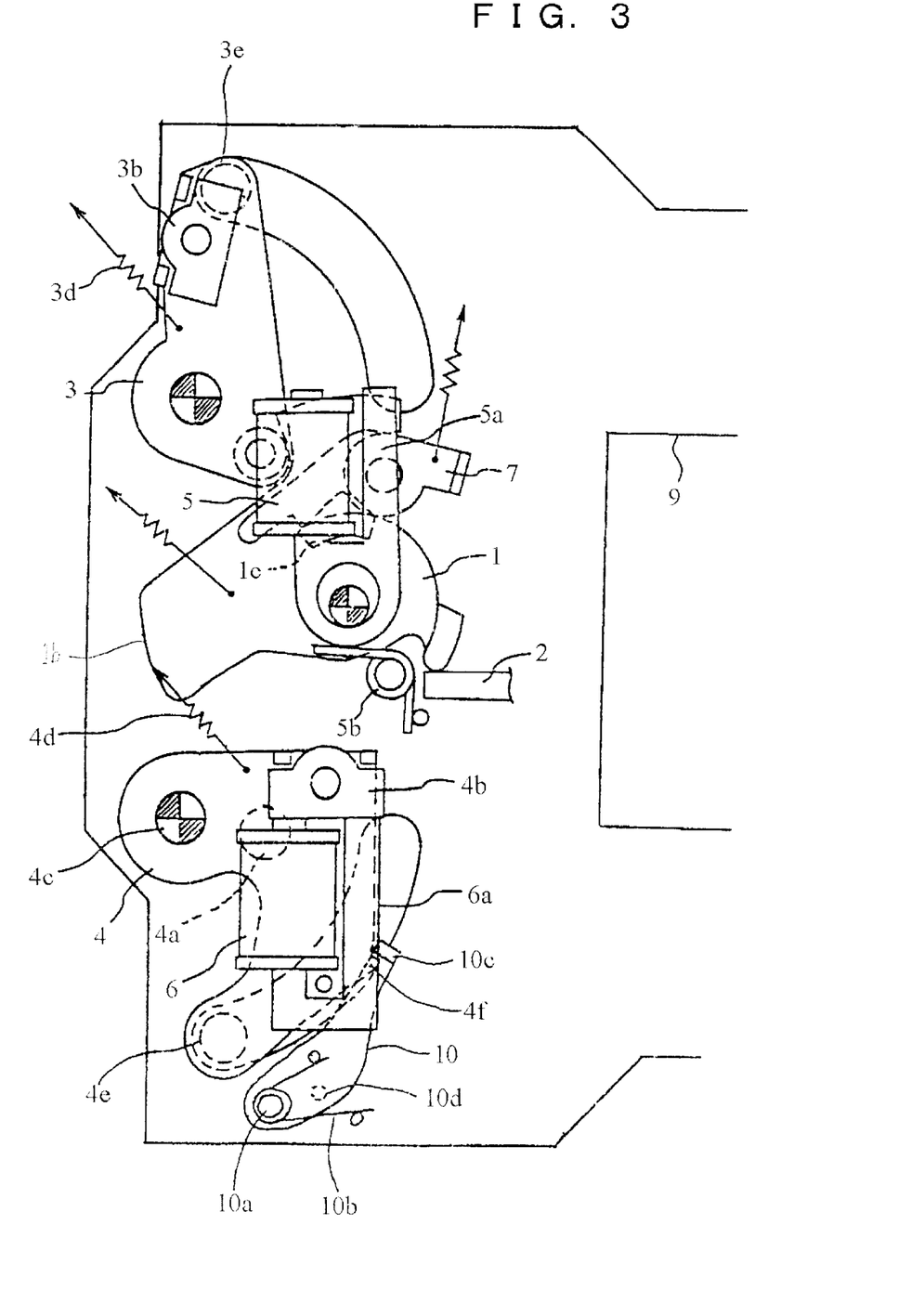
FIG. 3 is a plane view of the focal-plane shutter of FIG. 1 shown in an operational state.

In parallel with the operation, when the rear cover C is opened, the switch Sc provided at the camera main body shown in FIG. 6 is closed and electricity is conducted to the electromagnets 5 and 6 by the CPU 11. Further, the release operation of the camera is carried out similar to the case of closing the switch S. That is, as described above, the set lever claw 7 is operated and the set lever 1 is pivoted in the right pivoting direction from the state shown in FIG. 1. Thereafter, when electricity conduction to the electromagnet 5 is cut, the opening drive lever 3 is pivoted in the left pivoting direction to thereby evacuate the opening sector group A from the shutter opening. The holding lever 10 holds the drive lever 4 until the rear cover C is closed. Accordingly, the opening and closing shutter sectors do not emerge in the opening and a camera user does not touch the shutter sectors. That is, as shown in FIG. 3, the holding lever 10 holds the closing drive lever 4 and even when the electromagnet 6 is demagnetized, the closing drive lever 4 cannot be operated. When the rear cover C is closed, by pushing the pin 10*d* to the lower side of the drawing by the taper portion of the pin P and pivoting the holding lever 10 in the right pivoting direction, the closing sector group B is operated as a result of releasing the hook portion 4*f* by the bent portion 10*c*. FIG. 2 shows such a state.

Next, an explanation will be given of a second embodiment of a focal-plane shutter according to the present invention. Although a holding lever 10 is provided in the first embodiment, there is no need for the holding lever 10 in the second embodiment. When rear cover C of the camera is opened, the switch Sc provided at the camera main body shown in FIG. 6 is closed and the CPU 11 conducts electricity to the electromagnets 5 and 6. Further, an operation of releasing the shutter is carried out in a similar manner to the case of closing the switch S. In this case, the set lever claw 7 is operated and the set lever 1 is pivoted in the right pivoting direction from the state of FIG. 1. Thereafter, when electricity conduction to the magnet 5 is cut, the opening drive lever 3 is pivoted in the left pivoting direction to thereby evacuate the open sector group A from the shutter opening. However, electricity conduction to the electromagnet 6 is not cut but maintained until the rear cover C is closed. Therefore, the opening and closing shutter sectors do not emerge in the opening and the camera user will not touch the shutter sectors, such as during a film replacement operation. Accordingly, there is no concern of causing deformation of the shutter sectors and abnormal operation of the shutter is prevented.

In comparison with the first embodiment, the second embodiment achieves an advantage in which there is no need of providing the holding lever 10 although electricity needs to be conducted to the electromagnet 6 until the rear cover C is closed. Further, in the case in which the rear cover C is opened before setting the shutter, when the switch Sc shown in FIG. 6 is closed, the CPU 11 operates the motor M built in the camera after confirming that the shutter has not been wound and carries out the above-described operation after the setting operation of the shutter. Such operation is carried out instantaneously and therefore, the camera user cannot directly touch the shutter sectors. Further, when the shutter has not been set, as in the above-described embodiment, the above-described operation is carried out after setting the shutter.

Further, the problem of direct contact with the shutter sectors by the camera user can be avoided by providing a member, such as a locking lever, for preventing the rear cover from being opened instead of finishing to wind up the shutter as mentioned above when the shutter has not been set, and by providing a shutter construction in which the preventive operation is released in cooperation with setting of the shutter to thereby prevent the rear cover from being opened before setting of the shutter.

Next, an explanation will be given of a third embodiment as follows.

Although in the first embodiment the holding lever 10 is held at the nonoperational position by the pin P when the rear cover C is closed, the holding lever 10 can be held at the nonoperational position by other methods. For example, a permanent magnet can be provided at a vicinity of the holding lever 10 and an electromagnet apparatus can be provided at a position capable of applying reverse magnetic field on the permanent magnet. By constructing such a constitution, the holding lever 10 can be held at the nonoperational position by being adsorbed and held by the permanent magnet at a position at which the hook portion 4*f* of the closing drive lever 4 and the bent portion 10*c* are not engaged with each other. Further, when the rear cover C is opened by closing the switch Sc, holding of the holding lever 10 is released by conducting electricity to the electromagnet apparatus to demagnetize the adsorbing and holding force of the permanent magnet by the reverse magnetic field to thereby enable to operate the holding lever 10.

Further, in the above-described embodiments, the opening drive lever 3 and the closing drive lever 4 are controlled by the electromagnets 5 and 6, however, the present invention is not limited thereto. That is, the invention is applicable to a focal-plane shutter in which the set lever 1 starts operating by operating the set lever claw 7 and mechanical engagement of the open drive lever 3 and the close drive lever 4 is successively operated.

Although an embodiment has been described in which the shutter is operated in response to a signal of a switch or the like operated when the rear cover of the camera is opened, a similar problem is posed even in the case in which a mirror is pushed up from a front side of a single-lens reflex camera. Therefore, even in the case in which a photographing lens is removed and thereafter a mirror is pushed up, a full open state of the shutter is necessary in which both the opening and closing sector groups have been evacuated from the shutter opening. In this case, the full open state may be achieved by inputting into the CPU 11 a signal indicating the removal of a photographing lens of the camera and a signal indicating that the mirror of the camera has been pushed up.

According to the present invention, a focal-plane shutter is provided in which shutter sectors evacuate from the shutter opening by opening of a rear cover of the camera. By this construction, a camera user does not contact the shutter sectors, such as during a film replacement operation, thereby preventing damage to the shutter sectors and ensuring a continuous and accurate operation of the focal-plane shutter.

From the foregoing description, it can be seen that the present invention comprises an improved focal-plane shutter for a camera. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

I claim:

1. A focal-plane shutter for a camera comprising: a base plate for connection to a body of a camera having a rear cover which can be opened and closed during a film replacement operation, the base plate having a shutter opening; an opening sector group having a plurality of sectors for undergoing opening movement in an operational state to open the shutter opening during a shutter release operation; a closing sector group having a plurality of sectors for undergoing closing movement in an operational state to close the shutter opening during the shutter release operation; control means for controlling the opening sector group and the closing sector group to open and close the shutter opening, respectively; holding means for holding the closing sector group at a nonoperational position during an opening state of the rear cover of the camera and for releasing the hold of the closing sector group in the nonoperational position during a closing state of the rear cover of the camera; and means for preventing opening of the rear cover of the camera before setting of the shutter.

2. A focal-plane shutter for a camera according to claim 1; wherein the control means includes means for controlling the opening sector group to open the shutter opening by operation of a motor of the camera for setting the shutter when the rear cover of the camera is opened before setting of the shutter.

3. A focal-plane shutter according to claim 1; wherein the means for preventing opening of the rear cover of the camera comprises a locking lever.

4. A focal-plane shutter for a camera comprising: a base plate for connection to a body of a camera having a rear cover which can be opened and closed during a film replacement operation, the base plate having a shutter opening; an opening sector group having a plurality of sectors for undergoing opening movement to open the shutter opening during an exposure operation; a closing sector group having a plurality of sectors for undergoing closing movement to close the shutter opening during the exposure operation; control means for controlling the opening sector group and the closing sector group to open and close the shutter opening, respectively; and means for preventing opening of the rear cover of the camera before setting of the shutter.

5. A focal-plane shutter according to claim 4; wherein the means for preventing opening of the rear cover of the camera comprises a locking lever.

6. A focal-plane shutter for a camera comprising: a base plate for connection to a body of a camera having a rear cover which can be opened and closed during a film replacement operation, the base plate having a shutter opening; an opening sector group having a plurality of sectors for undergoing opening movement to open the shutter opening during an exposure operation; a closing sector group having a plurality of sectors for undergoing closing movement to close the shutter opening during the exposure operation; a motor for setting the shutter prior to commencing an exposure operation and for thereafter driving the opening sector group to open the shutter opening during an exposure operation; and means for preventing opening of the rear cover of the camera before the shutter is set by the motor.

7. A focal-plane shutter according to claim 6; further comprising holding means for holding the closing sector group at a nonoperational position during an opening state of the rear cover of the camera and for releasing the holding of the closing sector group in the nonoperational position during a closing state of the rear cover of the camera.

8. A focal-plane shutter according to claim 6; wherein the means for preventing opening of the rear cover of the camera comprises a locking lever.

* * * * *